US012602976B2

(12) United States Patent
Schwarz et al.

(10) Patent No.: US 12,602,976 B2
(45) Date of Patent: Apr. 14, 2026

(54) SAFETY SYSTEM AND METHOD FOR AN INTERNAL CABIN OF A VEHICLE

(71) Applicant: THE BOEING COMPANY, Arlington, VA (US)

(72) Inventors: Kai Schwarz, Hesse (DE); Miriam Cornel, Aschaffenburg (DE); Lukas Biesalski, Darmstadt (DE); Johannes Kleudgen, Darmstadt (DE); Michael Christian Büddefeld, Neu-Isenburg (DE)

(73) Assignee: The Boeing Company, Arlington, VA (US)

( * ) Notice: Subject to any disclaimer, the term of this patent is extended or adjusted under 35 U.S.C. 154(b) by 267 days.

(21) Appl. No.: 18/468,924

(22) Filed: Sep. 18, 2023

(65) Prior Publication Data

US 2025/0095468 A1      Mar. 20, 2025

(51) Int. Cl.
*G08B 17/10* (2006.01)
*G06V 20/59* (2022.01)
*B64D 45/00* (2006.01)

(52) U.S. Cl.
CPC .............. *G08B 17/10* (2013.01); *G06V 20/59* (2022.01); *B64D 2045/009* (2013.01)

(58) Field of Classification Search
CPC ........................................................ G08B 17/10

USPC .......................................................... 340/577
See application file for complete search history.

(56) References Cited

U.S. PATENT DOCUMENTS

| | | | | |
|---|---|---|---|---|
| 4,831,438 A | * | 5/1989 | Bellman, Jr. .... | G08B 13/19673 348/148 |
| 7,248,632 B1 | * | 7/2007 | McKenzie .......... | H04N 19/124 375/E7.176 |
| 10,691,955 B1 | * | 6/2020 | Correia Gracio ........ | G06N 5/04 |
| 10,723,481 B2 | * | 7/2020 | Gerard ............... | B64D 45/0059 |
| 2004/0008253 A1 | * | 1/2004 | Monroe ............. | H04B 7/18506 348/E7.086 |
| 2019/0308579 A1 | * | 10/2019 | Jouper ................... | B64D 11/06 |
| 2022/0067410 A1 | * | 3/2022 | Raz ...................... | A61B 5/7264 |
| 2024/0239150 A1 | * | 7/2024 | Rusciano ............. | G08B 17/125 |

* cited by examiner

*Primary Examiner* — Travis R Hunnings
(74) *Attorney, Agent, or Firm* — Joseph M. Butscher; Carroll, Hoette & Butscher LLC

(57) ABSTRACT

A system and a method include one or more sensors configured to detect one or more forces in relation to one or more components within an internal cabin of a vehicle. An imaging device is configured to acquire one or more images of the internal cabin of the vehicle. A control unit is in communication with the one or more sensors and the imaging device. The control unit is configured to determine one or more incidents within the internal cabin based on the one or more forces detected by the one or more sensors, and the one or more images acquired by the imaging device. The system and the method can also provide recommendations regarding actions to take in response determining incident(s).

20 Claims, 3 Drawing Sheets

SAFETY SYSTEM AND METHOD FOR AN INTERNAL CABIN OF A VEHICLE

FIELD OF THE DISCLOSURE

Examples of the present disclosure generally relate to safety systems and methods for internal cabins of vehicles, such as autonomous and remote-controlled vehicles configured to transport passengers between locations.

BACKGROUND OF THE DISCLOSURE

Aircraft are used to transport passengers and cargo between various locations. Numerous aircraft depart from and arrive at a typical airport every day.

During a flight of an aircraft, various types of incidents may occur that require immediate attention from flight attendants. For example, an unruly passenger may need to be addressed. The flight attendants are able to address various types of incidents, and report to other individuals, such as pilots, ground-based staff, emergency service personnel, and/or the like. In general, current emergency response plans (ERPs) for aircraft typically focus on a flight crew resolving safety issues, dealing with unruly passengers, and the like.

However, as autonomous aircraft continue to be developed, there may not be onboard flight crew to address and resolve various issues within an internal cabin of such aircraft.

SUMMARY OF THE DISCLOSURE

A need exists for a system and a method for identifying and addressing various issues within an internal cabin of a vehicle. Further, a need exists for such a system and a method in relation to an autonomous vehicle.

With those needs in mind, certain examples of the present disclosure provide a system including one or more sensors configured to detect one or more forces in relation to one or more components within an internal cabin of a vehicle. An imaging device is configured to acquire one or more images of the internal cabin of the vehicle. A control unit is in communication with the one or more sensors and the imaging device. The control unit is configured to determine one or more incidents within the internal cabin based on the one or more forces detected by the one or more sensors, and the one or more images acquired by the imaging device.

In at least one example, the system also includes a smoke detector configured to detect a presence of smoke or fire within the internal cabin of the vehicle. The control unit is in communication with the smoke detector. The control unit is configured to determine the one or more incidents within the internal cabin based on the one or more forces detected by the one or more sensors, the one or more images acquired by the imaging device, and the presence of smoke or fire as detected by the smoke detector.

In at least one example, the control unit is configured to compare the one or more forces detected by the one or more sensors with the one or more images acquired by the imaging device to determine one or both of a type of incident or a severity of the incident.

The vehicle can be an autonomous vehicle configured to be automatically operated to transport passengers within the internal cabin between different locations.

The one or more sensors can include one or more of a seat sensor configured to detect a weight or force exerted into a seat, a window sensor configured to detect force exerted into a window, and/or a wall sensor configured to detect force exerted into a wall.

The system can also include a user interface including one or both of a display or a speaker. The control unit is in communication with the user interface. The control unit is configured to output an alert signal to the user interface. The alert signal includes information regarding the one or more incidents. The information regarding the one or more incidents can include one or more recommended actions to resolve the one or more incidents.

In at least one example, the control unit is configured to differentiate between types of incidents based on human behavior information stored in a memory, and component malfunction data stored in the memory.

The control unit can be further configured to automatically control one or more aspects of the vehicle in response to determining the one or more incidents.

The control unit can be an artificial intelligence or machine learning system.

Certain examples of the present disclosure provide a method including detecting, by one or more sensors, one or more forces in relation to one or more components within an internal cabin of a vehicle; acquiring, by an imaging device, one or more images of the internal cabin of the vehicle; and determining, by a control unit in communication with the one or more sensors and the imaging device, one or more incidents within the internal cabin based on the one or more forces detected by the one or more sensors, and the one or more images acquired by the imaging device.

Certain examples of the present disclosure provide a vehicle, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a safety system and a method for an internal cabin of a vehicle, such as an autonomous aircraft. The systems and methods described herein enable individuals to address and resolve various safety issues that can arise onboard an aircraft, such as an autonomous vehicle. The systems and methods are configured to address issues during a trip (such as a flight) and automate various processes, such as documentation, thereby allowing remote pilots and/or supervisors to manage several autonomous vehicles at the same time.

In at least one example, the systems and methods are configured to detect intent of passengers within an internal cabin of a vehicle, and determine if (a) a crime was committed, and/or (b) an accident occurred. The systems and methods can further provide a recommendation for addressing the issue, such as based on a scale of damage, if passengers were involved, and the intent of the passengers.

Figures 1, 2:
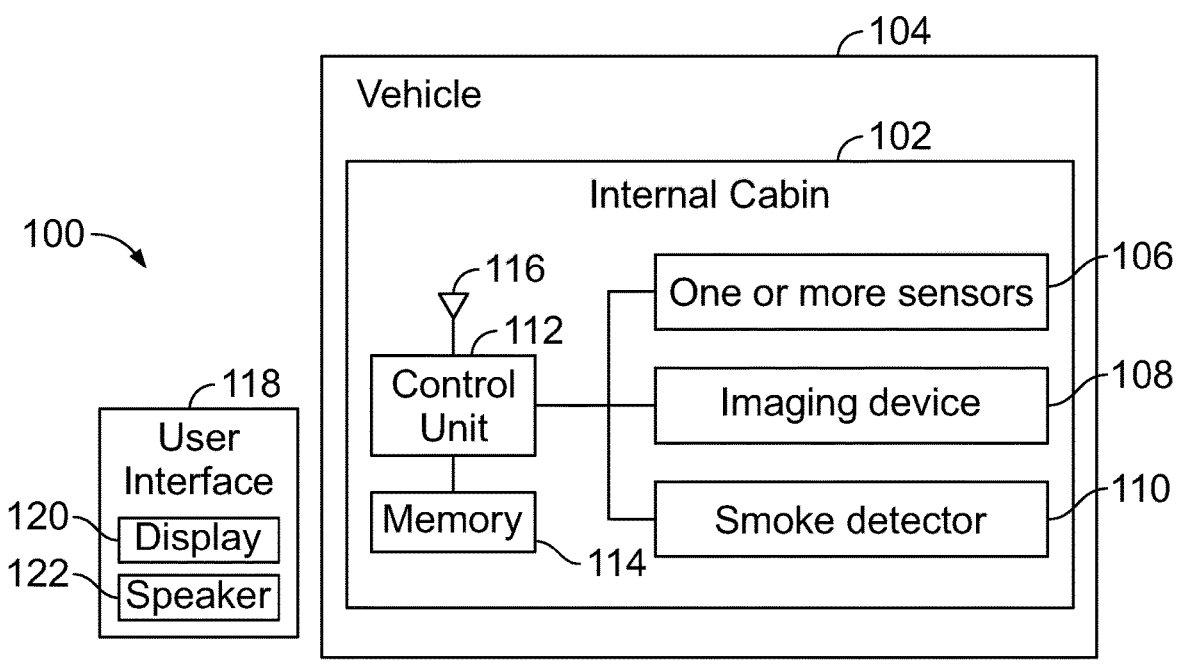
FIG. 1 illustrates a block diagram for a system for an internal cabin of a vehicle, according to an example of the present disclosure.
FIG. 2 illustrates a simplified schematic diagram for a system for an internal cabin of a vehicle, according to an example of the present disclosure.

FIG. 1 illustrates a block diagram for a system 100 for an internal cabin 102 of a vehicle 104, according to an example of the present disclosure. In at least one example, the vehicle 104 is an autonomous vehicle, which is configured to be automatically operated to transport passengers within the internal cabin between different locations. For example, the vehicle 104 can be a fully autonomous air taxi. As another example, the vehicle 104 can be remotely operated by an individual that is remotely located from the vehicle, such as a remotely operated drone aircraft. Alternatively, the vehicle 104 can be operated by individuals onboard the aircraft. As an example, the vehicle 104 can be a commercial aircraft that is operated by one or more pilots within a flight deck.

The system 100 includes one or more sensors 106 within the internal cabin 102. The sensors 106 can be configured to detect force, pressure, or the like. As an example, the sensors 106 include (a) a seat sensor configured to detect a weight or force exerted into a seat, (b) a window sensor configured to detect force exerted into a window, a crack within window, and/or the like, and (c) a wall sensor configured to detect force exerted into a wall.

In at least one example, the system 100 also includes an imaging device 108 configured to acquire images of the internal cabin 102. Examples of the imaging device 108 include a still camera, a video camera, and/or the like.

In at least one example, the system 100 also includes a smoke detector 110. The smoke detector 110 is configured to detect smoke and/or fire within the internal cabin 102. Alternatively, the system 100 does not include the smoke detector 110.

The system 100 also includes a control unit 112 in communication with the sensor(s) 106, the imaging device 108, and the smoke detector 110, such as through one or more wired or wireless connections. The control unit 112 can be within the internal cabin 102. Optionally, the control unit 112 can be within the vehicle 104, but outside of the internal cabin 102. As another example, the control unit 112 can be remotely located from the vehicle 104, such as at a central monitoring location.

The control unit 112 includes or is otherwise in communication with a memory 114, such as through one or more wired or wireless connections. The memory 114 can be or include a database that stores various types of predetermined data.

The control unit 112 is also in communication with a communication device 116, such as through one or more wired or wireless connections. The communication device 116 can be or include an antenna, a transceiver, a radio, and/or the like. The communication device 116 allows for communication with a user interface 118 that may be remote from the vehicle 104. For example, the user interface 118 can be a central monitoring location. The user interface 118 includes one or both of a display 120 (such as an electronic monitor, touchscreen interface, television, and/or the like), and/or a speaker 122. Alternatively, the user interface 118 is onboard the vehicle 104. For example, the control unit 112 and the user interface 118 can be within a flight deck or cockpit of an aircraft.

In operation, the sensor(s) 106, the imaging device 108, and the smoke detector 110 are configured to monitor the internal cabin 102 for incidents. For example, the sensor(s) 106 are configured to detect forces exerted into one or more portions of the internal cabin 102 (such as a seat, a wall, and/or a window). The control unit 112 receives force signals from the sensor(s) 106 regarding the detected forces. The control unit 112 compares the detected forces with force thresholds stored in the memory 114. For example, the force thresholds include force magnitudes associated with unruly behavior within the internal cabin 102, such as violent forces exerted by passengers into a seat, a wall, and/or a window. If the control unit 112 determines that the detected force(s) exceeds the predetermined force threshold, the control unit 112 determines that an incident detected by the sensor(s) 106 is a potential unruly passenger within the internal cabin 102. The control unit 112 then outputs a signal to the user interface 118, which can be shown on the display 120 and/or broadcast through the speaker 122. The signal includes information regarding the incident and optionally a recommended action to resolve the incident.

As another example, the imaging device 108 acquires images of the internal cabin 102. The control unit 112 receives image signals from the imaging device 108 that include the acquired image(s). The control unit 112 then compares the images with reference images stored in the memory 114. The reference images include images regarding acceptable behavior within the internal cabin 102. If the control unit 112 determines that the images received from the imaging device 108 differ from the reference images, the control unit 112 then determines that a potential unruly passenger incident may be occurring within the internal cabin 102. The control unit 112 then outputs a signal regarding the incident to the user interface 118, which can be shown on the display 120 and/or broadcast through the speaker 122.

As another example, the smoke detector 110 is configured to detect smoke and/or fire within the internal cabin 102 In response to detecting smoke or fire within the internal cabin 102, the smoke detector 110 outputs a fire signal to the control unit 112 indicative of smoke or fire within the internal cabin 102. The control unit 112 then outputs a signal regarding the smoke or fire to the user interface 118.

As described herein the system 100 includes the one or more sensors 106 configured to detect one or more forces in relation to one or more components (such as a seat, a wall, a window, or the like) within the internal cabin 102 of the vehicle 104. The imaging device 108 is configured to acquire one or more images of the internal cabin 102 of the vehicle 104. The control unit 112 is in communication with the one or more sensors 106 and the imaging device 108. The control unit 112 is configured to determine one or more incidents within the internal cabin 102 based on the one or more forces detected by the one or more sensors 106, and the one or more images acquired by the imaging device 108. Examples of the incidents include a malfunctioning component (such as a seat with a backrest that does not lock in place), an unruly passenger (such as who has damaged or is attempting to damage a component, or threaten another passenger, or the like), a fire, and the like.

In at least one example, the system 100 also includes the smoke detector 110 configured to detect a presence of smoke or fire within the internal cabin 102 of the vehicle 104. The control unit 112 is in communication with the smoke detector 110. The control unit 112 is further configured to determine the one or more incidents within the internal cabin 102 based on the one or more forces detected by the one or more sensors 106, the one or more images acquired by the imaging device 108, and the presence of smoke or fire as detected by the smoke detector 110.

In at least one example, the control unit 112 compares the one or more forces detected by the one or more sensors 106 with the one or more images acquired by the imaging device 108 to determine one or both of a type of incident or a severity of the incident. For example, the control unit 112 can compare such information to determine if a component is malfunctioning (for example, a seat with a faulty backrest), or if a passenger is purposely damaging the component. As described herein, the control unit 112 can differentiate between types of incidents based on human behavior information (such as images associated with a human damaging a component, threatening a passenger, and/or the like) stored in the memory 114, and component malfunction data (such as images of defective seats) stored in the memory 114.

FIG. 2 illustrates a simplified schematic diagram for a system 100 for an internal cabin 102 of a vehicle 104, according to an example of the present disclosure. In this example, a window sensor 106a is coupled to a window 130 disposed in a wall 132 of the internal cabin 102. The window sensor 106a can be a force or pressure sensor configured to detect forces exerted into the window 130, a crack within the window, and/or the like. The window sensor 106a is in communication with the control unit 112.

Further, a seat sensor 106b is coupled to a seat 134 within the internal cabin 102. The seat sensor 106b can be a force or pressure sensor configured to detect forces exerted into the seat 134. As another example, the seat sensor 106b can be an electronic scale configured to detect weight supported on the seat 134. The seat sensor 106b is in communication with the control unit 112.

Additionally, a wall sensor 106c is coupled to the wall 132. The wall sensor 106c can be a force or pressure sensor configured to detect forces exerted into the wall 132. The wall sensor 106c is in communication with the control unit 112.

The imaging device 108 can be mounted to a ceiling 140 of the internal cabin 102. Optionally, the imaging device 108 can be mounted to a wall 142 or a floor 144 of the internal cabin 102. The imaging device 108 is configured to acquire images (such as still photos, and/or video images) of the internal cabin 102. The imaging device 108 is in communication with the control unit 112.

The smoke detector 110 can be mounted to the ceiling of the internal cabin 102. Optionally, the smoke detector 110 can be mounted to a wall 142 or the floor 144. The smoke detector 110 is configured to detect smoke and/or fire within the internal cabin 102. The smoke detector 110 is in communication with the control unit 112.

Based on signals received from the sensors 106a-106c, the imaging device 108, and/or the smoke detector 110, the control unit 112 outputs an alert signal to the user interface 118. The alert signal is indicative of an incident alert, which includes an incident report and/or a recommended action to address an incident within the internal cabin. The incident alert can be shown on the display 120 (shown in FIG. 1) of the user interface 118, and/or broadcast through the speaker 122 (shown in FIG. 1).

As an example, the control unit 112 receives a force signal from the seat sensor 106b. The force signal exceeds a predetermined force threshold, thereby indicating damage to the seat 134. The control unit 112 then reviews image data received from the imaging device 108. The image data is associated with the seat 134. The image shows a passenger punching or kicking the seat 134. The control unit 112 then compares the received image with reference images showing a passenger seated in a normal position, and determines the difference therebetween. The control unit 112 can then analyze human behavior information stored in the memory, which provides information regarding intent of the passenger punching or kicking the seat 134. The intent may be determined through facial expressions, actions, and/or the like. The control unit 112 can compare the image data from the imaging device 108 with force data from the sensor(s) 106 to differentiate between a malfunctioning seat (such as via data regarding malfunctioning components stored in the memory 114) and an unruly passenger (such as via human behavior data stored in the memory 114).

As described, the control unit 112 assesses various different types and severity of incidents based on data received from the sensor(s) 106, the imaging device 108, and/or the smoke detector 110, and in relation to various types of data stored in the memory 114. In at least one example, the control unit 112 can compare and contrast data received from the sensor(s) 106, the imaging device 108, and/or the smoke detector 110 to determine a type and severity of an incident within the internal cabin 102.

In at least one example, the control unit 112 assesses a type and/or severity of an incident through a combination of image recognition of image data and data received from the sensor(s) 106. The control unit 112 validates the data received from the sensor(s) 106 and/or the smoke detector 110, and the imaging device 108. The control unit 112 can analyze the image data and determine intent of passengers within the internal cabin based on human behavior data stored in the memory 114.

In at least one example, the control unit 112 assesses damage within the internal cabin 102 based on data received from the sensor(s) 106 and/or the smoke detector 110, images received from the imaging device 108, and through image recognition based on reference images and data stored within the memory 114. The control unit 112 validates and weights an incident (for example, damage caused by an incident) through received data and reference data stored in the memory 114. Based on such information, the control unit 112 can differentiate if an unruly passenger committed a crime, or if a malfunction is taking place, and can further rank the incident based on stored information in the memory 114. The control unit 112 can the generate an incident report, which can be supplemented with image data, and a list of recommended actions to address the incident. The recommended actions can be associated with a determined incident, and stored in the memory 114.

In at least one example, the control unit 112 compares an incident to human behavior data and/or cabin component malfunction data stored in the memory 114. Such data can include pre-set incident values. An incident with intent (for example, a passenger attacking an interior component within the internal cabin) has a higher value assigned to it than a component (such as a seat) malfunction, due to such an incident requiring a more drastic action to address (such as by diverting a flight and alerting authorities). As the control unit 112 compares received data and stored data to determine a type and/or severity of an incident, the control unit 112 determines a best fit for the incident. Based on such inputs, an intent of a passenger can be determined. The control unit 112 can assign a value to the incident using machine learning, while taking the extent of the damage, involvement of passengers, and the intent of an offender (if one is involved) into consideration.

The control unit 112 can create incident values ranking from minor malfunctions (for example, a cabin light is not working) to a mission critical failure (for example, a fire within the internal cabin 102) using data stored within the memory 114, such as a whole security database. The control unit 112 generates a list that can be weighted using one or more thresholds, which can be variable based on current progress of a trip, locations of emergency services, landing sites, and/or the like. The threshold(s) can be updated and adapted over the course of a trip (such as a flight). Based on ranking, the control unit 112 generates the alert signal, which can include recommend actions (for example, flight derivation, contact emergency, and/or the like) to an operator of the vehicle 104. The control unit 112 can record each incident, and include such in a generated incident report.

In at least one example, the control unit 112 may automatically control one or more aspects of the vehicle 104 in response to determining an incident. For example, the control unit 112 may automatically operate one or more fire suppression devices within the internal cabin in response to determining that a fire is within the internal cabin 102. As another example, the control unit 112 may automatically take control of one or more control systems of the vehicle 104 to automatically operate the vehicle. For example, in response to the control unit 112 determining that a passenger is ill or a passenger is unruly, the control unit 112 may automatically operate the vehicle 104 to bring the vehicle 104 to a location of emergency services. Optionally, the control unit 112 may not automatically control aspect(s) of the vehicle 104.

Figures 3A, 3B:
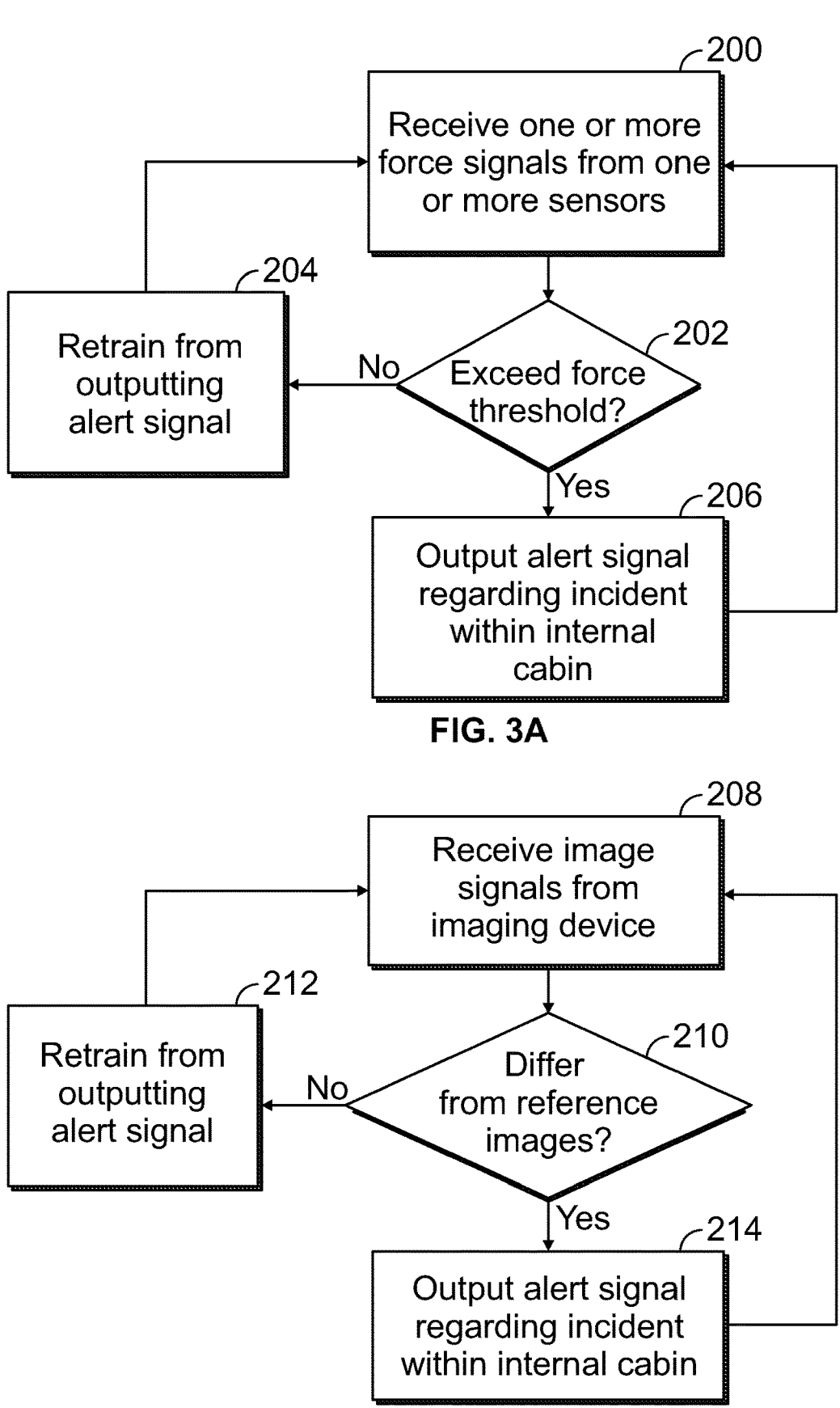
FIG. 3A illustrates a flow chart of a method, according to an example of the present disclosure.
FIG. 3B illustrates a flow chart of a method, according to an example of the present disclosure.

FIG. 3A illustrates a flow chart of a method, according to an example of the present disclosure. Referring to FIGS. 1-3A, at 200, the control unit 112 receives one or more force signals from the sensor(s) 106 (such as any of the sensors 106a, 106b, and/or 106c). At 202, the control unit 112 compares the forces included in the force signals with one or more predetermined force thresholds stored in the memory 114. If the forces do not exceed the force threshold(s) at 202, the method proceeds to 204, at which the control unit 112 refrains from outputting an alert signal, and the method returns to 200. In at least one example, the predetermined force threshold(s) can be updated, such as in real time, based on a status of a progress of a trip (such as via an acknowledgement of progress by an operator).

If, however, the forces exceed the force threshold(s) at 202, the control unit 112 outputs an alert signal regarding an excessive force incident within the internal cabin 102. The method then returns to 200.

FIG. 3B illustrates a flow chart of a method, according to an example of the present disclosure. Referring to FIGS. 1-3B, at 208, the control unit 112 receives image signals including one or more acquired images from the imaging device 108. At 210, the control unit 112 compares the acquired image(s) with reference images related to acceptable behavior within the internal cabin 102. If the acquired image(s) are similar to the reference images, the method proceeds to 212, at which the control unit 112 refrains from outputting an alert signal, and the method returns to 208.

If, however, the acquired images differ from the reference images, the method proceeds from 210, to 214, at which the control unit 112 outputs an alert signal regarding an incident of unruly behavior within the internal cabin 214. The method then returns to 208.

In at least one example, the imaging device 108 and the sensor(s) 106 cooperate with one another. For example, data received from the imaging device 108 is used to validate data received from the sensor(s) 106, or vice versa.

Figure 3C:
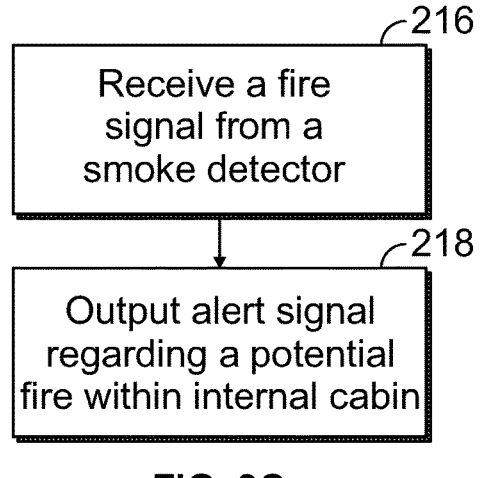
FIG. 3C illustrates a flow chart of a method, according to an example of the present disclosure.

FIG. 3C illustrates a flow chart of a method, according to an example of the present disclosure. Referring to FIGS. 1-3C, at 216, the control unit 112 receives a fire signal from the smoke detector 110. At 218, the control unit 112 then outputs an alert signal regarding a potential fire within the internal cabin 102.

The methods shown in FIGS. 3A-3C can occur concurrently or at different times. Data received from each of the sensor(s) 106, the imaging device 108, and the smoke detector 110 can be used to weight a particular incident, validate assessments, such as to eliminate, minimize, or otherwise reduce false positives, and/or the like.

Referring to FIGS. 1-3C, data from the sensors 106 can be cross-checked with data from the imaging device 108. For example, if forces detected by the sensors 106 exceed predetermined thresholds, the control unit 112 can then review image data to determine if an unruly passenger incident is occurring.

In at least one example, the control unit 112 can assess data regarding a potential incident based on a scale. The scale can be based on stored information regarding varying levels of incidents. The scale can associate detected incidents with values ranked from minor malfunctions to mission critical failures.

In at least one example, the control unit 112 can determine a type and/or severity of an incident (as detected by one or more of the sensor(s) 106, the imaging device 108, and/or the smoke detector 110) based on image recognition data stored in the memory 114, data regarding damage (to various structures within the internal cabin) stored in the memory 114, trip route and location information received from a tracking system or vehicle computer, human behavior data stored in the memory 114, emergency services information stored in the memory 114 and/or received from a central monitoring location, and/or the like.

The control unit 112 can further determine and output the alert signal based on the assessed data, and further generate recommended actions to an operator of the vehicle 104 (whether a remote operator or an operator onboard the vehicle 104). Various types of recommended actions can be associated with determined incidents, and stored in the memory 114. As an example, if the control unit 112 determines that an unruly passenger is being aggressive to other passengers, and/or attempting to damage components within the internal cabin 102, the control unit 112 can include a recommendation within the alert signal instructing an operator to broadcast an emergency warning within the internal cabin 102. As another example, the recommendation can include operating the vehicle to arrive at a particular location (such as landing an aircraft at a different location). As another example, if a fire is detected within the internal cabin 102, the recommendation can include bringing the vehicle to a particular location, alerting emergency services, operating fire suppression devices (such as sprinklers) within the internal cabin, and/or the like.

The control unit 112 can further generate an incident report regarding a detected incident within the internal cabin 102. The control unit 112 can output the incident report to the user interface 118, emergency services, authorities, and/or the like.

The system 100 increases passenger safety and cabin security in the absence of a cabin crew. As described, the control unit 112 is configured to recommend actions for approval to a remote crew, assess damage, interpret camera input to identify aggressive human behavior, and generate an incident report. In at least one example, the control unit 112 also analyzes image data from the imaging device 108 to verify damage within the internal cabin 102, and/or a potential fire within the internal cabin 102. By analyzing and comparing data received from the sensor(s) 106, the imaging device 108, and the smoke detector 110, the control unit 112 is able to eliminate, minimize, or otherwise reduce false alarms.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 112 may be or include one or more processors that are configured to control operation, as described herein.

The control unit 112 is configured to execute a set of instructions that are stored in one or more data storage units or elements (such as one or more memories), in order to process data. For example, the control unit 112 may include or be coupled to one or more memories. The data storage units may also store data or other information as desired or needed. The data storage units may be in the form of an information source or a physical memory element within a processing machine.

The set of instructions may include various commands that instruct the control unit 112 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 112. It is to be understood that the processing or control units may represent circuits, circuitry, or portions thereof that may be implemented as hardware with associated instructions (for example, software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 112 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one example, all or part of the systems and methods described herein may be or otherwise include an artificial intelligence (AI) or machine-learning system that can automatically perform the operations of the methods also described herein. For example, the control unit 112 can be an artificial intelligence or machine learning system. These types of systems may be trained from outside information and/or self-trained to repeatedly improve the accuracy with how the data is analyzed to determine incidents within the internal cabin 102. Over time, these systems can improve by determining incidents with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of incidents within the internal cabin 102. The training minimizes conflicts and interference by performing an iterative training algorithm, in which the systems are retrained with an updated set of data (for example, data received during and/or after each trip of the vehicle 104) and based on the feedback examined prior to the most recent training of the systems. This provides a robust analysis model that can better determine various types and severity levels of incidents within the internal cabin 102.

In at least one embodiment, components of the system 100, such as the control unit 112, provide and/or enable a computer system to operate as a special computer system for determining incidents within the internal cabin 102.

Figure 4:
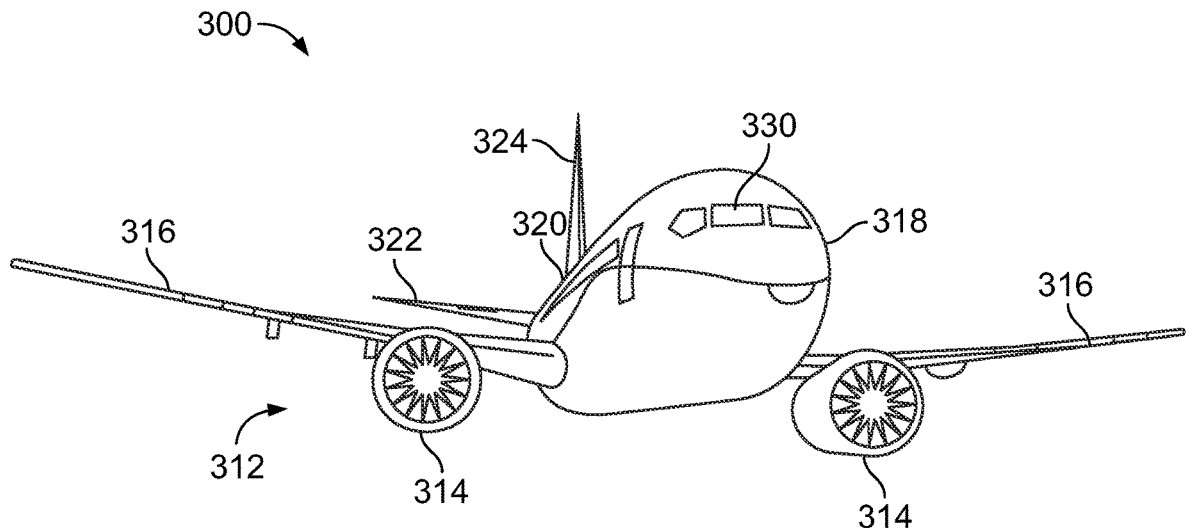
FIG. 4 illustrates a perspective front view of an aircraft, according to an example of the present disclosure.

FIG. 4 illustrates a perspective front view of an aircraft 300, according to an example of the present disclosure. The aircraft 300 is an example of the vehicle 104 shown in FIG. 1. In at least one example, the aircraft 300 is an autonomous aircraft such that no onboard pilot operates the aircraft 300. As another example, the aircraft 300 can be remotely operated from a location outside of the aircraft 300. As another example, the aircraft 300 can be operated by one or more pilots within a flight deck.

The aircraft 300 includes a propulsion system 312 that includes engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer 324. The fuselage 318 of the aircraft 300 defines an internal cabin 330. FIG. 4 shows an example of an aircraft 300. It is to be understood that the aircraft 300 can be sized, shaped, and configured differently than shown in FIG. 4. Optionally, examples of the present disclosure can be used with various other types of vehicles, such as automobiles, buses, trains, watercraft, spacecraft, or the like.

Further, the disclosure comprises examples according to the following clauses:

Clause 1. A system comprising:

one or more sensors configured to detect one or more forces in relation to one or more components within an internal cabin of a vehicle;

an imaging device configured to acquire one or more images of the internal cabin of the vehicle; and a control unit in communication with the one or more sensors and the imaging device, wherein the control unit is configured to determine one or more incidents within the internal cabin based on the one or more forces detected by the one or more sensors, and the one or more images acquired by the imaging device.

Clause 2. The system of Clause 1, further comprising a smoke detector configured to detect a presence of smoke or fire within the internal cabin of the vehicle, wherein the control unit is in communication with the smoke detector, and wherein the control unit is configured to determine the one or more incidents within the internal cabin based on the one or more forces detected by the one or more sensors, the one or more images acquired by the imaging device, and the presence of smoke or fire as detected by the smoke detector.

Clause 3. The system of Clauses 1 or 2, wherein the control unit is configured to compare the one or more forces detected by the one or more sensors with the one or more images acquired by the imaging device to determine one or both of a type of incident or a severity of the incident.

Clause 4. The system of any of Clauses 1-3, wherein the vehicle is an autonomous vehicle configured to be automatically operated to transport passengers within the internal cabin between different locations.

Clause 5. The system of any of Clauses 1-4, wherein the one or more sensors comprise one or more of:

a seat sensor configured to detect a weight or force exerted into a seat;

a window sensor configured to detect force exerted into a window; or a wall sensor configured to detect force exerted into a wall.

Clause 6. The system of Clause 5, wherein the one or more sensors comprise the seat sensor, the window sensor, and the wall sensor.

Clause 7. The system of any of Clauses 1-6, further comprising a user interface comprising one or both of a display or a speaker, wherein the control unit is in communication with the user interface, wherein the control unit is configured to output an alert signal to the user interface, wherein the alert signal includes information regarding the one or more incidents.

Clause 8. The system of Clause 7, wherein the information regarding the one or more incidents includes one or more recommended actions to resolve the one or more incidents.

Clause 9. The system of any of Clauses 1-8, wherein the control unit is configured to differentiate between types of incidents based on human behavior information stored in a memory, and component malfunction data stored in the memory.

Clause 10. The system of any of Clauses 1-9, wherein the control unit is further configured to automatically control one or more aspects of the vehicle in response to determining the one or more incidents.

Clause 11. The system of any of Clauses 1-10, wherein the control unit is an artificial intelligence or machine learning system.

Clause 12. A method comprising:

detecting, by one or more sensors, one or more forces in relation to one or more components within an internal cabin of a vehicle;

acquiring, by an imaging device, one or more images of the internal cabin of the vehicle; and determining, by a control unit in communication with the one or more sensors and the imaging device, one or more incidents within the internal cabin based on the one or more forces detected by the one or more sensors, and the one or more images acquired by the imaging device.

Clause 13. The method of Clause 12, further comprising detecting, by a smoke detector in communication with the control unit, a presence of smoke or fire within the internal cabin of the vehicle, and wherein said determining comprises determining the one or more incidents within the internal cabin based on the one or more forces detected by the one or more sensors, the one or more images acquired by the imaging device, and the presence of smoke or fire as detected by the smoke detector.

Clause 14. The method of Clauses 12 or 13, wherein said determining comprises:

comparing the one or more forces detected by the one or more sensors with the one or more images acquired by the imaging device; and determining, by said comparing, one or both of a type of incident or a severity of the incident.

Clause 15. The method of any of Clauses 12-14, wherein the vehicle is an autonomous vehicle configured to be automatically operated to transport passengers within the internal cabin between different locations, and wherein the one or more sensors comprise:

a seat sensor configured to detect a weight or force exerted into a seat;

a window sensor configured to detect force exerted into a window; and a wall sensor configured to detect force exerted into a wall.

Clause 16. The method of any of Clauses 12-15, further comprising outputting, by the control unit, an alert signal to a user interface comprising one or both of a display or a speaker, wherein the alert signal includes information regarding the one or more incidents.

Clause 17. The method of Clause 16, wherein the information regarding the one or more incidents includes one or more recommended actions to resolve the one or more incidents.

Clause 18. The method of any of Clauses 12-17, wherein said determining comprises differentiating between types of incidents based on human behavior information stored in a memory, and component malfunction data stored in the memory.

Clause 19. The method of any of Clauses 12-18, further comprising automatically controlling, by the control unit, one or more aspects of the vehicle in response to determining the one or more incidents.

Clause 20. A vehicle comprising:

an internal cabin;

one or more sensors configured to detect one or more forces in relation to one or more components within the internal cabin;

an imaging device configured to acquire one or more images of the internal cabin;

a smoke detector configured to detect a presence of smoke or fire within the internal cabin; and a control unit in communication with the one or more sensors, the imaging device, and the smoker detector, wherein the control unit is configured to determine one or more incidents within the internal cabin based on the one or more forces detected by the one or more sensors, the one or more images acquired by the imaging device, and the presence of smoke or fire detected by the smoke detector, wherein the control unit is configured to compare the one or more forces detected by the one or more sensors with the one or more images acquired by the imaging device to determine one or both of a type of incident or a severity of the incident, and wherein the control unit is configured to differentiate between types of incidents based on human behavior information stored in a memory, and component malfunction data stored in the memory.

As described herein, examples of the present disclosure provide systems and methods for identifying and addressing various issues within an internal cabin of a vehicle. Further, examples of the present disclosure provide such systems and methods in relation to various types of vehicles, such as autonomous vehicles.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

one or more sensors configured to detect one or more forces in relation to one or more components within an internal cabin of a vehicle;

an imaging device configured to acquire one or more images of the internal cabin of the vehicle; and a control unit in communication with the one or more sensors and the imaging device, wherein the control unit is configured to:

determine one or more incidents within the internal cabin based on the one or more forces detected by the one or more sensors, and the one or more images acquired by the imaging device, and differentiate between types of incidents based on human behavior information stored in a memory, and component malfunction data stored in the memory.

2. The system of claim 1, further comprising a smoke detector configured to detect a presence of smoke or fire within the internal cabin of the vehicle, wherein the control unit is in communication with the smoke detector, and wherein the control unit is configured to determine the one or more incidents within the internal cabin based on the one or more forces detected by the one or more sensors, the one or more images acquired by the imaging device, and the presence of smoke or fire as detected by the smoke detector.

3. The system of claim 1, wherein the control unit is configured to compare the one or more forces detected by the one or more sensors with the one or more images acquired by the imaging device to determine one or both of a type of incident or a severity of the incident.

4. The system of claim 1, wherein the vehicle is an autonomous vehicle configured to be automatically operated to transport passengers within the internal cabin between different locations.

5. The system of claim 1, wherein the one or more sensors comprise one or more of:

a seat sensor configured to detect a weight or force exerted into a seat;

15
16 a window sensor configured to detect force exerted into a window; or a wall sensor configured to detect force exerted into a wall.

6. The system of claim 5, wherein the one or more sensors comprise the seat sensor, the window sensor, and the wall sensor.

7. The system of claim 1, further comprising a user interface comprising one or both of a display or a speaker, wherein the control unit is in communication with the user interface, wherein the control unit is configured to output an alert signal to the user interface, and wherein the alert signal includes information regarding the one or more incidents.

8. The system of claim 7, wherein the information regarding the one or more incidents includes one or more recommended actions to resolve the one or more incidents.

9. The system of claim 1, wherein the control unit is further configured to automatically control one or more aspects of the vehicle in response to determining the one or more incidents.

10. The system of claim 1, wherein the control unit is an artificial intelligence or machine learning system.

11. A method comprising:

detecting, by one or more sensors, one or more forces in relation to one or more components within an internal cabin of a vehicle;

acquiring, by an imaging device, one or more images of the internal cabin of the vehicle; and determining, by a control unit in communication with the one or more sensors and the imaging device, one or more incidents within the internal cabin based on the one or more forces detected by the one or more sensors, and the one or more images acquired by the imaging device, wherein said determining comprises differentiating between types of incidents based on human behavior information stored in a memory, and component malfunction data stored in the memory.

12. The method of claim 11, further comprising detecting, by a smoke detector in communication with the control unit, a presence of smoke or fire within the internal cabin of the vehicle, and wherein said determining comprises determining the one or more incidents within the internal cabin based on the one or more forces detected by the one or more sensors, the one or more images acquired by the imaging device, and the presence of smoke or fire as detected by the smoke detector.

13. The method of claim 11, wherein said determining comprises:

comparing the one or more forces detected by the one or more sensors with the one or more images acquired by the imaging device; and determining, by said comparing, one or both of a type of incident or a severity of the incident.

14. The method of claim 11, wherein the vehicle is an autonomous vehicle configured to be automatically operated to transport passengers within the internal cabin between different locations, and wherein the one or more sensors comprise:

a seat sensor configured to detect a weight or force exerted into a seat;

a window sensor configured to detect force exerted into a window; and a wall sensor configured to detect force exerted into a wall.

15. The method of claim 11, further comprising outputting, by the control unit, an alert signal to a user interface comprising one or both of a display or a speaker, wherein the alert signal includes information regarding the one or more incidents.

16. The method of claim 15, wherein the information regarding the one or more incidents includes one or more recommended actions to resolve the one or more incidents.

17. The method of claim 11, further comprising automatically controlling, by the control unit, one or more aspects of the vehicle in response to determining the one or more incidents.

18. A vehicle comprising:

an internal cabin;

one or more sensors configured to detect one or more forces in relation to one or more components within the internal cabin;

an imaging device configured to acquire one or more images of the internal cabin;

a smoke detector configured to detect a presence of smoke or fire within the internal cabin; and a control unit in communication with the one or more sensors, the imaging device, and the smoker detector, wherein the control unit is configured to determine one or more incidents within the internal cabin based on the one or more forces detected by the one or more sensors, the one or more images acquired by the imaging device, and the presence of smoke or fire detected by the smoke detector, wherein the control unit is configured to compare the one or more forces detected by the one or more sensors with the one or more images acquired by the imaging device to determine one or both of a type of incident or a severity of the incident, and wherein the control unit is configured to differentiate between types of incidents based on human behavior information stored in a memory, and component malfunction data stored in the memory.

19. A system comprising:

one or more sensors configured to detect one or more forces in relation to one or more components within an internal cabin of a vehicle;

an imaging device configured to acquire one or more images of the internal cabin of the vehicle;

a control unit in communication with the one or more sensors and the imaging device, wherein the control unit is configured to determine one or more incidents within the internal cabin based on the one or more forces detected by the one or more sensors, and the one or more images acquired by the imaging device; and a user interface comprising one or both of a display or a speaker, wherein the control unit is in communication with the user interface, wherein the control unit is configured to output an alert signal to the user interface, wherein the alert signal includes information regarding the one or more incidents, and wherein the information regarding the one or more incidents includes one or more recommended actions to resolve the one or more incidents.

20. The system of claim 19, wherein the vehicle is an autonomous vehicle configured to be automatically operated to transport passengers within the internal cabin between different locations.

* * * * *